US012646842B2

(12) United States Patent
Minamitani

(10) Patent No.: US 12,646,842 B2
(45) Date of Patent: Jun. 2, 2026

(54) ANTENNA MODULE AND COMMUNICATION APPARATUS EQUIPPED WITH THE SAME

(71) Applicant: Murata Manufacturing Co., Ltd., Nagaokakyo (JP)

(72) Inventor: Natsumi Minamitani, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 199 days.

(21) Appl. No.: 18/491,838

(22) Filed: Oct. 23, 2023

(65) Prior Publication Data

US 2024/0047883 A1 Feb. 8, 2024

Related U.S. Application Data

(63) Continuation of application No. PCT/JP2022/010567, filed on Mar. 10, 2022.

(30) Foreign Application Priority Data

Apr. 26, 2021 (JP) ................................ 2021-074086

(51) Int. Cl.
*H01Q 21/06* (2006.01)
*H01Q 1/22* (2006.01)
*H01Q 5/45* (2015.01)

(52) U.S. Cl.
CPC ............ *H01Q 5/45* (2015.01); *H01Q 1/2283* (2013.01); *H01Q 21/065* (2013.01)

(58) Field of Classification Search
CPC ...... H01Q 1/2283; H01Q 5/45; H01Q 21/065; H01Q 9/0407
See application file for complete search history.

(56) References Cited

U.S. PATENT DOCUMENTS

2015/0333407 A1* 11/2015 Yamagajo .............. H01Q 5/307 343/905
2019/0020121 A1* 1/2019 Paulotto ................. H01Q 21/28
2020/0212569 A1* 7/2020 Kumar ................. H01Q 21/065

FOREIGN PATENT DOCUMENTS

JP H01-243605 A 9/1989
JP H02-107003 A 4/1990
(Continued)

OTHER PUBLICATIONS

International Search Report and Written Opinion mailed on May 24, 2022, received for PCT Application PCT/JP2022/010567, filed on Mar. 10, 2022, 8 pages including English Translation.

*Primary Examiner* — Daniel Munoz
(74) *Attorney, Agent, or Firm* — XSENSUS LLP

(57) ABSTRACT

An antenna module includes a dielectric substrate, first and second radiating electrodes, a ground electrode, and first and second dielectrics on a top part of the dielectric substrate. The second radiating electrode is smaller in size than the first radiating electrode and overlaps with the first radiating electrode in a plan view in a direction of a normal line of the dielectric substrate. The ground electrode is disposed to face the first and second radiating electrodes. The first and second dielectrics have different dielectric constants. The first radiating electrode is disposed between the second radiating electrode and the ground electrode. In the plan view in the direction of the normal line of the dielectric substrate, the second dielectric lies over the second radiating electrode and is disposed within an area of the first radiating electrode. The first dielectric lies over at least a peripheral edge of the first radiating electrode.

19 Claims, 11 Drawing Sheets

(56) References Cited

FOREIGN PATENT DOCUMENTS

| | | | |
|---|---|---|---|
| JP | H09-036647 | A | 2/1997 |
| JP | 6798656 | B1 | 12/2020 |

* cited by examiner (A)

(B)

(A)

(B)

ANTENNA MODULE AND COMMUNICATION APPARATUS EQUIPPED WITH THE SAME

CROSS-REFERENCE TO RELATED APPLICATIONS

This application is a continuation of international application no. PCT/JP2022/010567, filed Mar. 10, 2022, which claims priority to Japanese application no. 2021-074086, filed Apr. 26, 2021. The entire contents of both prior applications are hereby incorporated by reference.

TECHNICAL FIELD

The present disclosure relates to an antenna module, a communication apparatus equipped with the same, and technology for improving antenna characteristics.

BACKGROUND ART

A configuration includes an object equivalent to a dielectric disposed on each of unit antennas in an array antenna using the patch antennas. The configuration leads to an increase in aperture efficiency of each unit antenna and thus a reduction in arrangement density of the antennas, enabling power loss reduction.

CITATION LIST

Patent Document

Patent Document 1: Japanese Unexamined Patent Application Publication No. 1-243605

SUMMARY

Technical Problem

In recent years, development of communication apparatuses supporting multiple communication standards has been promoted. Such a communication apparatus is required to transmit and receive electric waves in different frequency bands specified on a per communication standard basis and thus includes antenna devices for respective frequency bands.

A multi-band antenna with a stack structure in which a plurality of radiating electrodes are disposed in an overlapping manner on a shared dielectric substrate is known as an antenna for electric waves in a plurality of frequency bands. In such an antenna with the stack structure, it is not necessarily possible to optimize antenna characteristics for each frequency band on occasions due to a structural restriction.

The present disclosure has been made to address at least the issue as described above, and thus aspects of the disclosure improve the antenna characteristics of radiating electrodes for respective different frequency bands in a multi-band type antenna module with the stack structure in which the radiating electrodes are disposed.

Solution to Problem

An antenna module according to a first aspect of the present disclosure includes a dielectric substrate; a first radiating electrode and a second radiating electrode that are disposed on the dielectric substrate; a ground electrode; and a first dielectric and a second dielectric that are disposed on a top part of the dielectric substrate. The second radiating electrode is smaller in size than the first radiating electrode and is disposed to overlap with the first radiating electrode in a plan view in a direction of a normal line of the dielectric substrate. The ground electrode is disposed to face the first radiating electrode and the second radiating electrode. The first dielectric has a dielectric constant that is different from a dielectric constant of the second dielectric. In the dielectric substrate, the first radiating electrode is disposed between the second radiating electrode and the ground electrode. In the plan view in the direction of the normal line of the dielectric substrate, the second dielectric lies over the second radiating electrode and is disposed within an area of the first radiating electrode, and the first dielectric lies over at least a peripheral edge of the first radiating electrode.

An antenna module according to a second aspect of the present disclosure includes a dielectric substrate; a ground electrode disposed on the dielectric substrate; a plurality of radiating elements disposed to face the ground electrode; and a first dielectric and a second dielectric. The first dielectric has a dielectric constant that is different from a dielectric constant of the second dielectric. The first and second dielectrics are disposed on the top part of the dielectric substrate. Each of the plurality of radiating elements includes a first radiating electrode, and a second radiating electrode. The second radiating electrode is smaller in size than the first radiating electrode. In a plan view in a direction of a normal line of the dielectric substrate, the second radiating electrode is disposed to overlap with the first radiating electrode. In the dielectric substrate, the first radiating electrode is disposed between the second radiating electrode and the ground electrode. In the plan view in the direction of the normal line of the dielectric substrate, the second dielectric lies over the second radiating electrode and is disposed within an area of the first radiating electrode, and the first dielectric lies over at least a peripheral edge of the first radiating electrode.

A communication apparatus according to a third aspect of the present disclosure includes: a casing including a first dielectric and a second dielectric that have respective dielectric constants different from each other; and an antenna module disposed in the casing. The antenna module includes a dielectric substrate, a first radiating electrode and a second radiating electrode that are disposed on the dielectric substrate, and a ground electrode. The second radiating electrode is smaller in size than the first radiating electrode and is disposed to overlap with the first radiating electrode in a plan view in a direction of a normal line of the dielectric substrate. The ground electrode is disposed to face the first radiating electrode and the second radiating electrode. In the dielectric substrate, the first radiating electrode is disposed between the second radiating electrode and the ground electrode. In the plan view in the direction of the normal line of the dielectric substrate, the second dielectric lies over the second radiating electrode and is disposed within an area of the first radiating electrode, and the first dielectric lies over at least a peripheral edge of the first radiating electrode.

Effects

In the antenna module and the communication apparatus according to the present disclosure, the two radiating electrodes are disposed in such a manner as to overlap with the dielectric substrate, and the dielectric (the second dielectric) lying over a radiating electrode for higher frequencies (the second radiating electrode) and a dielectric (the first dielectric) lying over the peripheral edge of a radiating electrode for lower frequencies (the first radiating electrode) are disposed on the dielectric substrate. The first dielectric has a dielectric constant that is different from a dielectric constant of the second dielectric. As described above, the dielectrics each having the dielectric constant appropriate for a corresponding one of the radiating electrodes are provided in the multi-band type antenna module with the stack structure and the communication apparatus, the antenna characteristic of the radiating electrode can thereby be improved.

DETAILED DESCRIPTION

Figure 1:
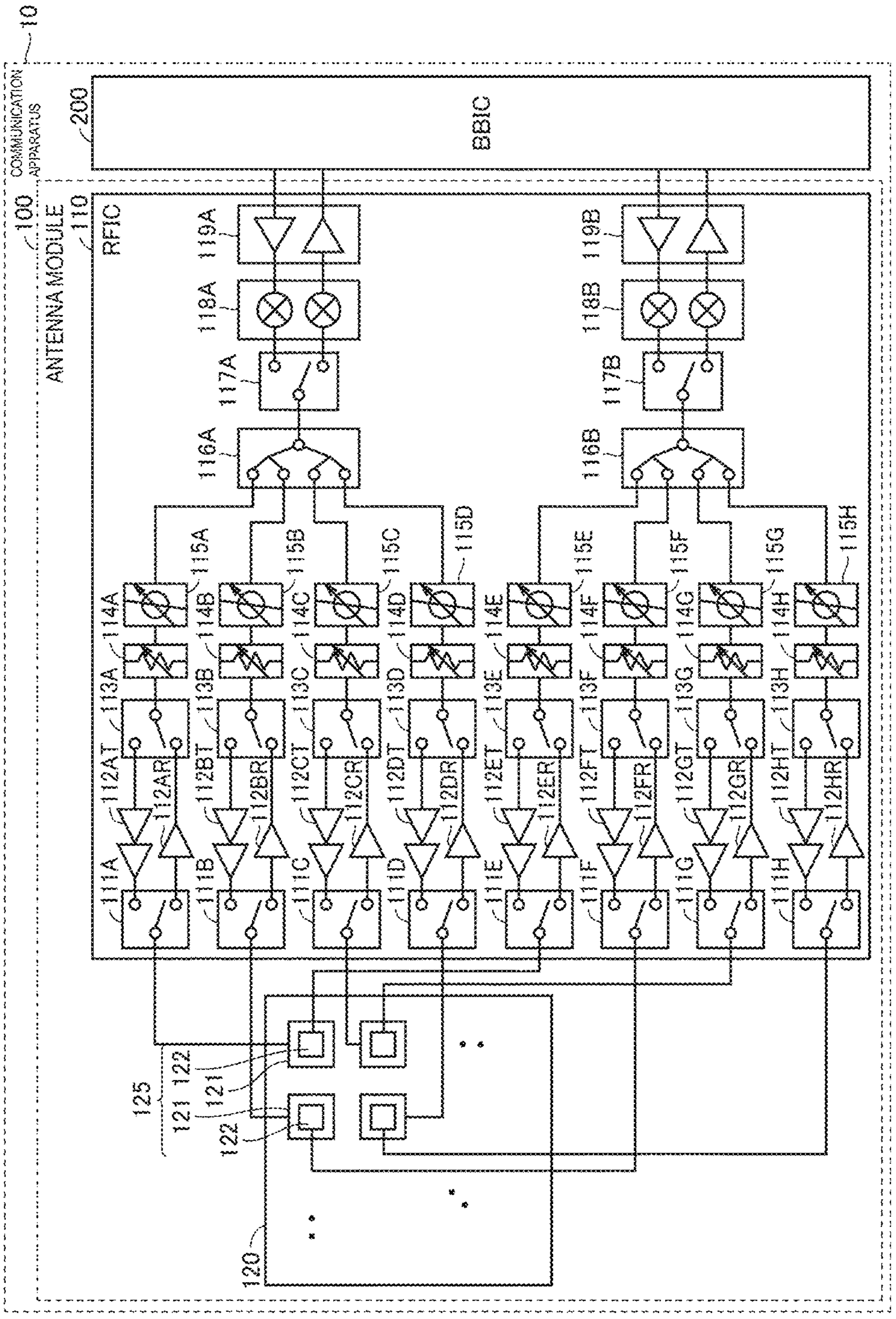
FIG. 1 is a block diagram of a communication apparatus to which an antenna module according to exemplary Embodiment 1 is applied.

Hereinafter, exemplary embodiments of the present disclosure will be described in detail with reference to the drawings. The same or corresponding components in the drawings are denoted by the same reference numerals, and the description thereof is not repeated.

Embodiment 1

(Basic Configuration of Communication Apparatus)

FIG. 1 is an example of a block diagram of a communication apparatus 10 according to this exemplary Embodiment 1 to which an antenna module 100 is applied. For example, the communication apparatus 10 is a mobile terminal such as a mobile phone, a smartphone, or a tablet, or a personal computer having a communication function. An example of the frequency band of an electric wave used for the antenna module 100 according to this exemplary embodiment is a millimeter wave band having a center frequency of, for example, 28 GHz, 39 GHz, or 60 GHz; however, an electric wave in a frequency band other than the above is also applicable.

With reference to FIG. 1, the communication apparatus 10 includes the antenna module 100 and a BBIC 200 forming a baseband signal processing circuit. The antenna module 100 includes an RFIC 110 that is an example of a feeder circuit and an antenna device 120. The communication apparatus 10 upconverts a signal transmitted from the BBIC 200 to the antenna module 100 into a radio-frequency signal by using the RFIC 110 and emits the signal from the antenna device 120. The communication apparatus 10 also transmits the radio-frequency signal received by the antenna device 120 to the RFIC 110 and downconverts the signal by using the BBIC 200.

The antenna module 100 is an antenna module of what is called a dual band type that is capable of emitting electric waves in two different frequency bands. The antenna device 120 includes, as radiating elements 125, a plurality of radiating electrodes 121 that emit electric waves with lower frequencies and a plurality of radiating electrodes 122 that emit electric waves with higher frequencies.

For easy explanation, FIG. 1 illustrates the configuration of the RFIC 110 having component groups each corresponding to four radiating electrodes of the plurality of radiating electrodes (feed elements) 121 and 122 constituting the antenna device 120 and omits the configuration of the other radiating electrodes having the same configuration. FIG. 1 illustrates an example in which the antenna device 120 is composed of the plurality of radiating electrodes 121 and 122 disposed in a two-dimensional array, but a one-dimensional array in which the plurality of radiating electrodes 121 and 122 are disposed in line may also be used. The antenna device 120 may also have a configuration in which one radiating electrode 121 and one radiating electrode 122 are provided. In this exemplary embodiment, the radiating electrodes 121 and 122 are both a plate-shaped patch antenna.

The RFIC 110 includes switches 111A to 111H, 113A to 113H, 117A, and 117B, power amplifiers 112AT to 112HT, low-noise amplifiers 112AR to 112HR, attenuators 114A to 114H, phase shifters 115A to 115H, a signal multiplexer/demultiplexer 116A, a signal multiplexer/demultiplexer 116B, mixers 118A and 118B, and amplifier circuits 119A and 119B. Of these components, the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal multiplexer/demultiplexer 116A, the mixer 118A, and the amplifier circuit 119A form a circuit for each radiating electrode 121 for lower frequencies. The switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal multiplexer/demultiplexer 116B, the mixer 118B, and the amplifier circuit 119B form a circuit for each radiating electrode 122 for higher frequencies.

In a case where a radio-frequency signal is transmitted, the switches 111A to 111H and 113A to 113H are switched over to the power amplifiers 112AT to 112HT, and the switches 117A and 117B are connected to amplifiers on the transmission side in the amplifier circuits 119A and 119B. In a case where the radio-frequency signal is received, the switches 111A to 111H and 113A to 113H are switched over to the low-noise amplifiers 112AR to 112HR, and the switches 117A and 117B are connected to amplifiers on the reception side in the amplifier circuits 119A and 119B.

Signals transmitted from the BBIC 200 are amplified by the amplifier circuits 119A and 119B and upconverted by the mixers 118A and 118B. The transmission signals that are upconverted radio-frequency signals are demultiplexed into four signals by the signal multiplexer/demultiplexer 116A and the signal multiplexer/demultiplexer 116B and supplied to the radiating electrodes 121 and 122 via respective signal paths. At this time, the phase degrees of the respective phase shifters 115A to 115H disposed on the signal paths are controlled individually, and the directivity of the antenna device 120 can thereby be controlled. The attenuators 114A to 114D control the strength of the transmission signal.

Reception signals that are radio-frequency signals received by the respective radiating electrodes 121 and 122 are transmitted to the RFIC 110 and multiplexed by the signal multiplexer/demultiplexer 116A and the signal multiplexer/demultiplexer 116B via four respective different signal paths. The multiplexed reception signals are down-converted by the mixers 118A and 118B, amplified by the amplifier circuits 119A and 119B, and transmitted to the BBIC 200.

The RFIC 110 is formed, for example, as an integrated circuit component as one chip having the above-described circuit configuration. Alternatively, devices (a switch, a power amplifier, a low-noise amplifier, an attenuator, and a digital phase shifter) for each of the radiating electrodes 121 and 122 in the RFIC 110 may be formed as an integrated circuit component as one chip for the corresponding radiating electrode. In addition, although FIG. 1 illustrates the configuration in which the RFIC 110 is isolated from the antenna device 120, as to be described later with reference to FIG. 2 or the like, the RFIC 110 may be mounted on the dielectric substrate having the corresponding radiating electrodes 121 and 122 disposed thereon and thus may integrally form the antenna device 120.

(Antenna Module Structure)

Figure 2:
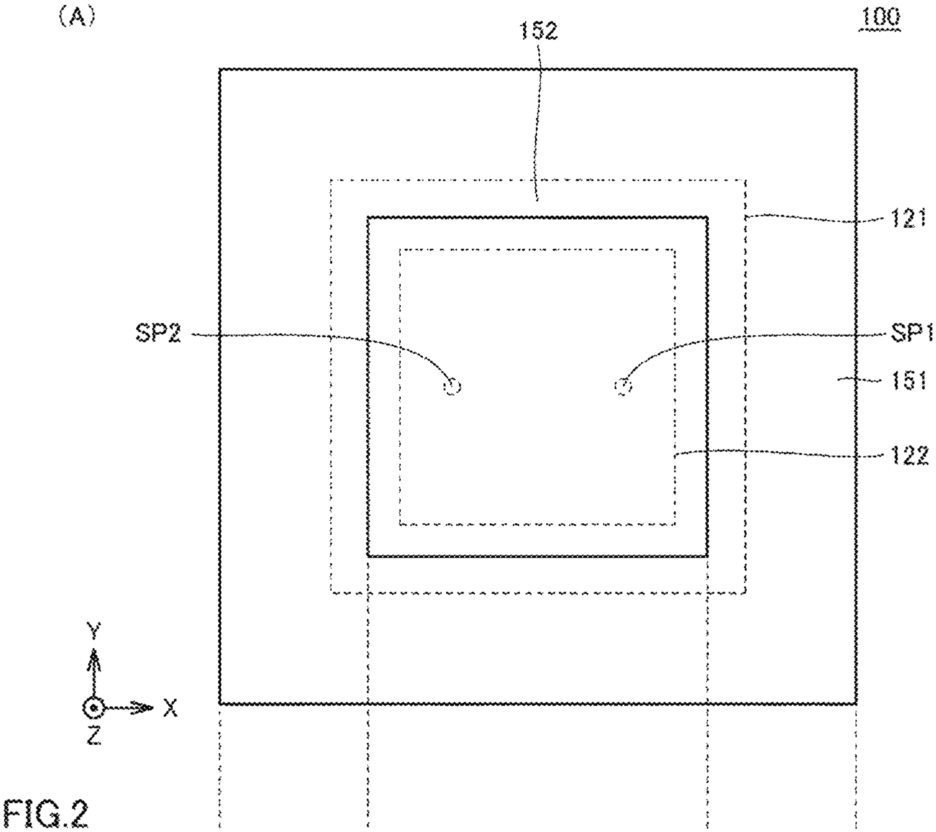
FIG. 2(A) represents a plan view of the antenna module in FIG. 1.
FIG. 2(B) represents a side perspective view of the antenna module in FIG. 1.
Figure 2:
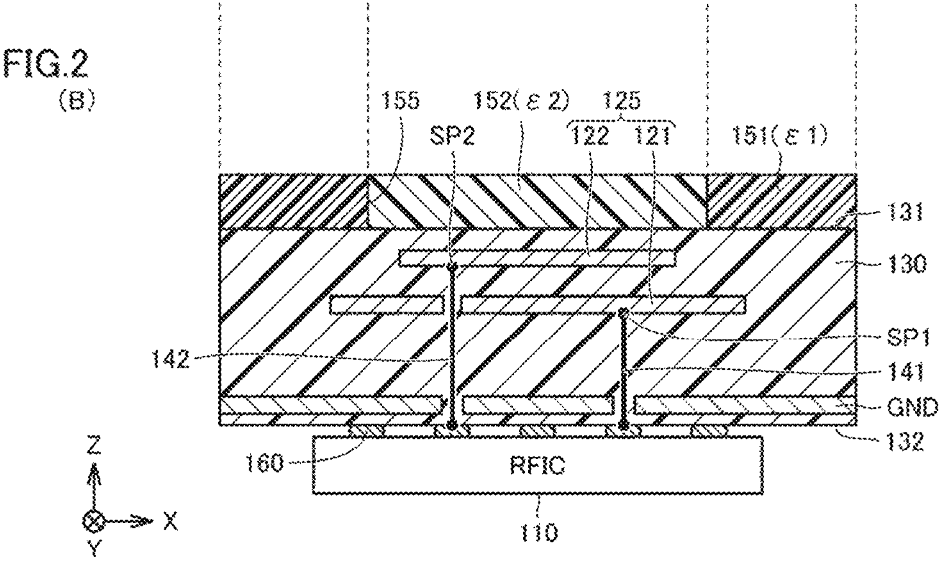

Details of the configuration of the antenna module 100 in exemplary Embodiment 1 will then be described by using FIG. 2. FIG. 2 represents a plan view of the antenna module 100 (FIG. 2(A)) in an upper part and a side perspective view (FIG. 2(B)) in a lower part. For easy explanation, a case where one radiating electrode 121 and one radiating electrode 122 are illustrated in FIG. 2 is described as an example.

The antenna module 100 includes a dielectric substrate 130, feed wiring lines 141 and 142, dielectrics 151 and 152, and a ground electrode GND in addition to the radiating electrodes 121 and 122 and the RFIC 110. In the following description, a direction of a normal line of the dielectric substrate 130 (an emission direction of an electric wave) is a Z-axis direction. On a surface perpendicular to the Z-axis direction, a direction in which the radiating electrodes 121 and 122 are disposed is defined as an X axis, and a direction orthogonal to the X axis is defined as a Y axis. A positive direction and a negative direction along the Z axis in the drawings are respectively referred to as an upper side and a lower side on occasions.

The dielectric substrate 130 is, for example, a low-temperature co-fired ceramic (LTCC) multi-layer substrate, a multi-layer resin substrate formed by laminating multiple resin layers formed from resin such as epoxy or polyimide, a multi-layer resin substrate formed by laminating multiple resin layers formed from liquid crystal polymer (LCP) having a lower dielectric constant, a multi-layer resin substrate formed by laminating multiple resin layers formed from fluorine-based resin, a multi-layer resin substrate formed by laminating multiple resin layers formed from a PET (Polyethylene Terephthalate) material, or a ceramic multi-layer substrate other than the LTCC. The dielectric substrate 130 does not necessarily have to have the multi-layer structure and may be a single-layer substrate.

In the plan view in the normal line direction (Z-axis direction), the dielectric substrate 130 has a rectangular shape. The radiating electrode 122 is disposed in a dielectric layer (a dielectric layer on the upper side) close to an upper surface 131 (a surface in the positive direction along the Z axis) of the dielectric substrate 130. The radiating electrode 122 may be disposed in such a manner as to be exposed from the surface of the dielectric substrate 130 and may be disposed in the dielectric layer inside the dielectric substrate 130 as in FIG. 2.

The radiating electrode 121 is disposed in the dielectric layer closer to a lower surface 132 than the radiating electrode 122 is in such a manner as to face the radiating electrode 122. The ground electrode GND is disposed over an entire dielectric layer close to the lower surface 132 of the dielectric substrate 130 to face the radiating electrodes 121 and 122. In a plan view in a direction of a normal line of the dielectric substrate 130 (Z-axis direction), the radiating electrodes 121 and 122 and the ground electrode GND overlap with each other. The radiating electrode 121 is thus disposed between the radiating electrode 122 and the ground electrode.

Each of the radiating electrodes 121 and 122 is a rectangular plate-shaped electrode. The size of the radiating electrode 122 is smaller than the size of the radiating electrode 121, and the resonant frequency of the radiating electrode 122 is higher than the resonant frequency of the radiating electrode 121. The frequency band of the electric wave emitted from the radiating electrode 122 is higher than the frequency band of the electric wave emitted from the radiating electrode 121. The antenna module 100 is thus a dual-band-type stack-structure antenna module capable of emitting electric waves with two mutually different frequency bands.

A radio-frequency signal is supplied from the RFIC 110 to each of the radiating electrodes 121 and 122 via a corresponding one of the feed wiring lines 141 and 142. The feed wiring line 141 penetrates through the ground electrode GND from the RFIC 110 and is connected to a feed point SP1 of the radiating electrode 121. The feed wiring line 142 penetrates through the ground electrode GND and the radiating electrode 121 from the RFIC 110 and is connected to a feed point SP2 of the radiating electrode 122. The feed point SP1 is shifted from the center of the radiating electrode 121 in the positive direction along the X axis, and the feed point SP2 is shifted from the center of the radiating electrode 122 in the negative direction along the X axis. An electric wave is thereby emitted from each of the radiating electrodes 121 and 122 in the X-axis direction serving as a polarization direction.

The RFIC 110 is mounted on the lower surface 132 of the dielectric substrate 130 with solder bumps 160 interposed therebetween. The RFIC 110 may be connected to the dielectric substrate 130 by using multipole connectors, instead of the soldering connection.

The dielectrics 151 and 152 are disposed on the upper surface 131 of the dielectric substrate 130. The respective dielectric constants ε1, ε2 of the dielectrics 151 and 152 are each higher than the dielectric constant of the dielectric substrate 130, and further, a dielectric constant ε1 of the dielectric 151 is higher than a dielectric constant ε2 of the dielectric 152 (ε1>ε2). In exemplary Embodiment 1, the thickness of the dielectric 151 is almost equal to the thickness of the dielectric 152.

As illustrated in FIG. 2(A), in the plan view in the direction of the normal line of the dielectric substrate 130, the dielectric 152 has a rectangular shape and is disposed in such a manner as to lie over the radiating electrode 122. The dielectric 152 is larger in size than the radiating electrode 122 and smaller than the radiating electrode 121 is. The dielectric 152 is thus disposed within the area of the radiating electrode 121.

The dielectric 151 is disposed in an area not including the dielectric 152 on the upper surface 131 of the dielectric substrate 130. In the plan view in the direction of the normal line of the dielectric substrate 130, a cavity 155 is formed in the dielectric 151, and the dielectric 152 is disposed in the cavity 155. The cavity 155 is formed within the area of the radiating electrode 121. The dielectric 151 thus lies over a peripheral edge of the radiating electrode 121. Although FIG. 2 illustrates the configuration in which the dielectrics 151 and 152 are in contact with each other at the boundary surface, a gap may be provided between the dielectric 151 and the dielectric 152.

(Band Widening Principle)

Figure 3:
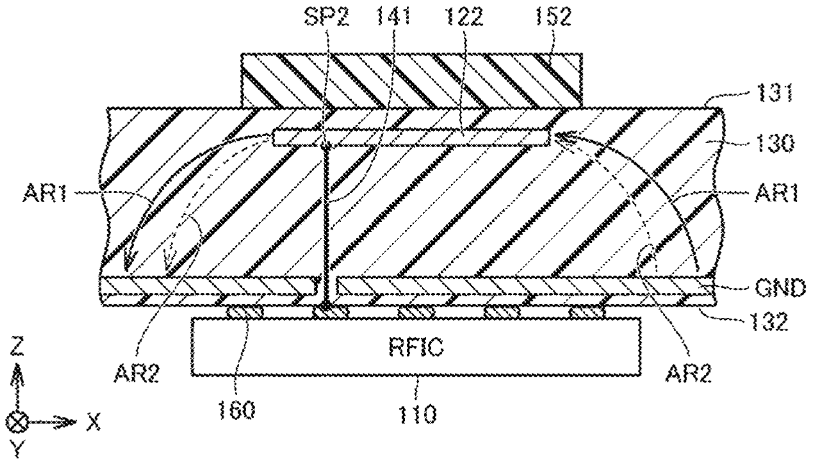
FIG. 3 is a view for explaining a principle of band widening due to a high dielectric member.

As described above, the frequency band of an electric wave emitted from a radiating electrode can be widened with the configuration in which the dielectric having a high dielectric constant lies over the radiating electrode. The principle of the frequency band widening will be described by using FIG. 3. For easy explanation, FIG. 3 illustrates the configuration in which only the radiating electrode 122 is disposed on the dielectric substrate 130 and only the dielectric 152 is disposed as a dielectric on the substrate.

Typically, in the plate-shaped patch antenna, as a Q value determined from a ratio between radiant power and accumulated power due to a radiating electrode and a ground electrode becomes lower, a frequency bandwidth tends to be widened. For example, if a distance between the radiating electrode and the ground electrode is made longer, or if a dielectric constant between the radiating electrode and the ground electrode is lowered, the Q value is lowered, and thus the frequency bandwidth is widened.

If a dielectric having a higher dielectric constant than that of a dielectric substrate lies over the top part of the radiating electrode, a surface acoustic wave generated from the radiating electrode tends to be stronger. As illustrated in FIG. 3, a line of electric force generated from an end portion of the radiating electrode in a direction along an electrode surface thus extends farther in a case of the presence of the dielectric having the high dielectric constant (a solid-line arrow AR1) than in a case of the absence of the dielectric having the higher dielectric constant (a broken-line arrow AR2). The resultant longer path length of the line of electric force from the radiating electrode to the ground electrode consequently leads to a state equivalent to the longer distance between the radiating electrode and the ground electrode. Accordingly, disposing the dielectric having the high dielectric constant to lie over the top part of the radiating electrode leads to a lower Q value of the patch antenna and consequently to the frequency bandwidth widening. Since the line of electric force generated by the radiating electrode is generated from the end portion, in the polarization direction, having the largest electric field, the dielectric having the high dielectric constant may be disposed in such a manner as to lie over at least the peripheral edge, in the polarization direction, of the radiating electrode.

The larger the influence of the dielectric disposed on the radiating electrode on the surface acoustic wave, the higher the dielectric constant of the dielectric. Accordingly, the higher the dielectric constant, the higher the frequency bandwidth widening effect. However, when the dielectric constant becomes higher than a threshold, a high-order mode of the surface acoustic wave occurs and adversely affects the electric wave emission from the radiating electrode. The frequency bandwidth widening and the occurrence of the high-order mode of the surface acoustic wave thus have a tradeoff relationship.

In contrast, the dielectric tends to influence the surface acoustic wave more sensitively as the frequency of the electric wave emitted from the radiating electrode becomes higher. Accordingly, if dielectrics have the same thickness, the dielectric constant of the dielectric is required to be lowered as the frequency of the emitted electric wave becomes higher. That is, if one type of dielectric lies over the radiating electrode, adjusting the dielectric constant of the dielectric to the antenna characteristic of the radiating electrode for lower frequencies leads to an excessively large influence on the radiating electrode for higher frequencies, and thus it is not possible to obtain a desirable state of the frequency bandwidth and the beam pattern of the radiating electrode for higher frequencies. On the other hand, adjusting the dielectric constant of the dielectric to the antenna characteristic of the radiating electrode for higher frequencies leads to an insufficient effect on the radiating electrode for lower frequencies, and thus it is not possible to achieve a sufficient frequency widening effect.

In the antenna module 100 of exemplary Embodiment 1, as described above, the two radiating electrodes 121 and 122 of the respective different sizes are disposed on the dielectric substrate 130 with the stack structure, and each of the different dielectrics lies over the peripheral edge, in the polarization direction, of a corresponding one of the radiating electrodes. The configuration as described above enables the intensity of the surface acoustic wave of each of the radiating electrodes 121 and 122 to be controlled individually, and thus the frequency bandwidth of both of the respective radiating electrodes 121 and 122 disposed even on the shared dielectric substrate 130 can be appropriately widened.

The radiating electrode 121 and the radiating electrode 122 in exemplary Embodiment 1 respectively correspond to a first radiating electrode and a second radiating electrode in the present disclosure. The dielectric 151 and the dielectric 152 in exemplary Embodiment 1 respectively correspond to a first dielectric and a second dielectric in the present disclosure. The cavity 155 in exemplary Embodiment 1 corresponds to a first cavity in the present disclosure.

Modification 1

For the antenna module 100 of exemplary Embodiment 1, the configuration in which the boundary surface between the dielectrics 151 and 152 disposed on the dielectric substrate 130 extends in the direction of the normal line of the dielectric substrate 130 (Z-axis direction) has heretofore been described; however, the boundary surface between the dielectrics 151 and 152 does not necessarily have to cause such a shape.

Figure 4:
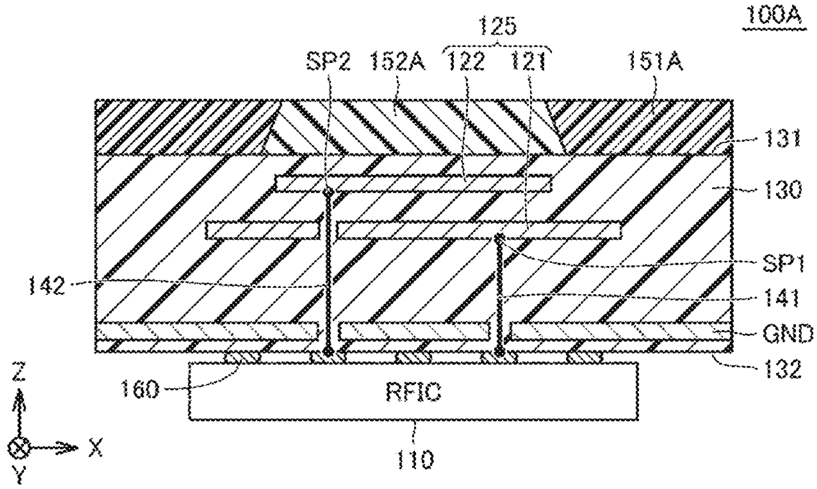
FIG. 4(A) is a side perspective view of antenna modules of Modification 1.
FIG. 4(B) is another side perspective view of antenna modules of Modification 1.
Figure 4:
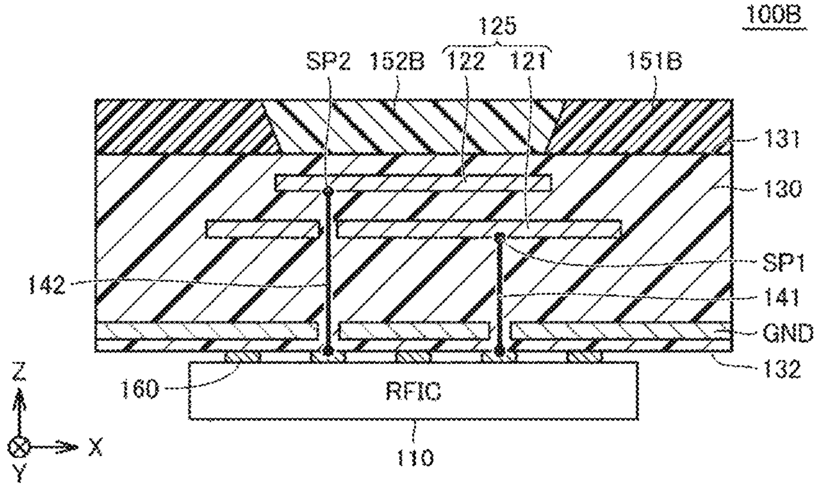

FIG. 4 is a side perspective view of antenna modules 100A and 100B of Modification 1. In the description with reference to FIG. 4 and the following modifications, the description of the components overlapping with those of the antenna module 100 of exemplary Embodiment 1 is not repeated.

In an antenna module 100A represented in the upper part (FIG. 4(A)) in FIG. 4, a boundary surface between a dielectric 151A and a dielectric 152A is formed to cause a taper shape in which a dimension of the dielectric 152A becomes smaller in the Z-axis direction. Shaping the boundary surface between the dielectrics like this enables an area having the respective coexistent dielectric constants of the dielectric 151A and the dielectric 152A to be formed, and controlling the angle of the taper enables an average dielectric constant in the area to be controlled.

Alternatively, like an antenna module 100B in the lower part (FIG. 4(B)) in FIG. 4, the boundary surface between a dielectric 151B and a dielectric 152B may be formed to cause an inversed taper shape in which a dimension of the dielectric 152B becomes larger in the Z-axis direction. Shaping the boundary surface between the dielectrics like this enables an area having the respective coexistent dielectric constants of the dielectric 151A and the dielectric 152A to be formed, and controlling the angle of the taper enables an average dielectric constant in the area to be controlled.

The boundary surface between the two dielectrics may be uneven, and the boundary surface may be stepped; however, this is not illustrated in the figure.

Also in the configuration of Modification 1, the dielectrics having the high dielectric constants are disposed individually for the radiating electrodes in the dual-band-type stack-structure antenna module, and thus the antenna characteristic of each radiating electrode can be appropriately controlled by setting a corresponding one of the dielectric constants of the respective dielectrics appropriately for the radiating electrode. As the result, the antenna characteristic of the entire antenna module can be improved.

Modification 2

For the antenna module 100 of exemplary Embodiment 1, the case where the dielectric 152 used for the radiating electrode 122 for higher frequencies is larger in size as a whole than the radiating electrode 122 has heretofore been described. For Modification 2, a case where the dielectric used for the radiating electrode 122 is larger in shape than the radiating electrode 122 only in the polarization direction will be described.

Figure 5:
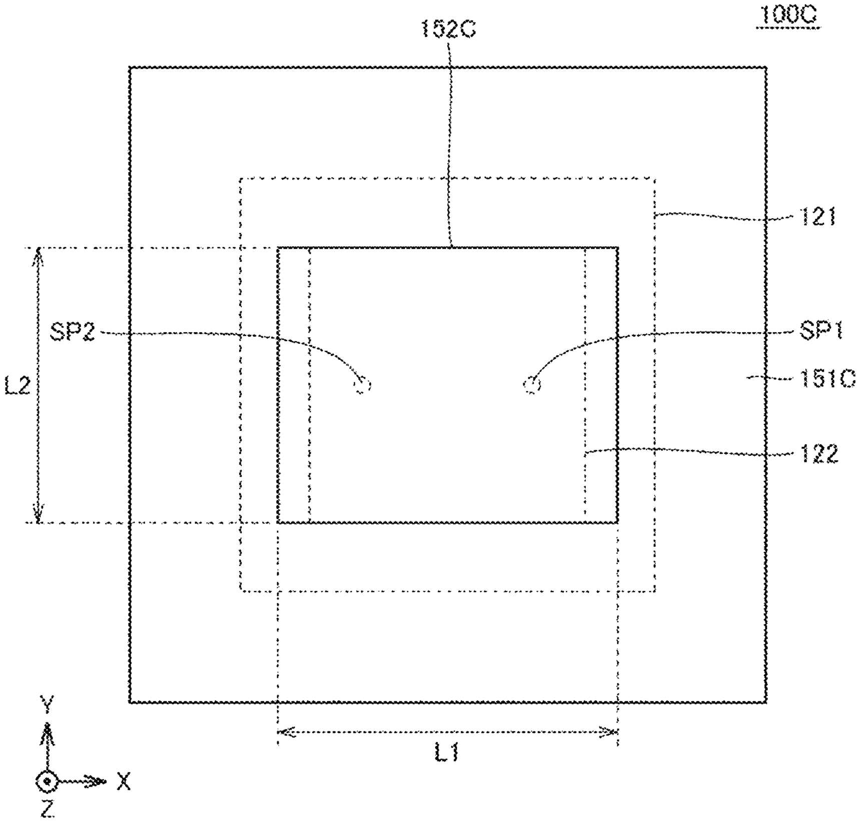
FIG. 5 is a plan view of an antenna module of Modification 2.

FIG. 5 is a plan view of an antenna module 100C of Modification 2. In the antenna module 100C, a dimension L1, in the polarization direction (X-axis direction), of a dielectric 152C disposed for the radiating electrode 122 is larger than the dimension of the radiating electrode 122; however, the antenna module 100C is formed such that a dimension L2 in the direction (Y-axis direction) orthogonal to the polarization direction is almost the same as the dimension of the radiating electrode 122.

As described above, the line of electric force generated by the radiating electrode is generated from the end portion, in the polarization direction, of the radiating electrode, the end portion having the highest electric field. For this reason, even if the dimension, in the direction orthogonal to the polarization direction, of the dielectric is not larger than that of the radiating electrode, the dimension influences the antenna characteristic slightly. Accordingly, also in the case where the dimension, only in the polarization direction (X-axis direction), of the dielectric 152 is larger than the dimension of the radiating electrode 122 as in the antenna module 100C of Modification 2, an advantageous effect equivalent to that of the antenna module 100 of exemplary Embodiment 1 can be exerted.

Modification 3

The antenna module 100 of exemplary Embodiment 1 has a configuration in which the outer shape of the dielectric 151 used for the radiating electrode 121 for lower frequencies coincides with the overall shape of the dielectric substrate 130. However, if the dielectric 151 lies over the peripheral edge of the corresponding radiating electrode 121, the shape of the dielectric 151 does not necessarily have to coincide with the shape of the dielectric substrate 130.

Figure 6:
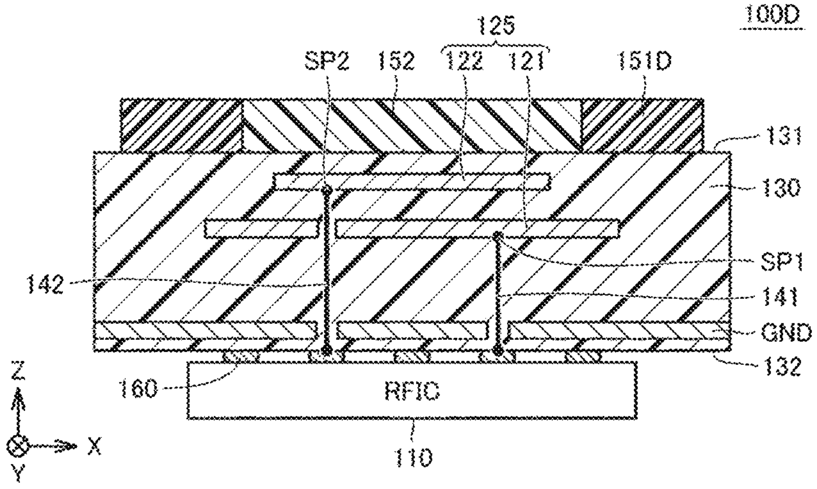
FIG. 6 is a side perspective view of an antenna module of Modification 3.

FIG. 6 is a side perspective view of an antenna module 100D of Modification 3. In the antenna module 100D, the outer dimension of a dielectric 151D provided for the radiating electrode 121 for lower frequencies is smaller than the outer dimension of the dielectric substrate 130. As long as the dielectric 151D lies over the peripheral edge, in the polarization direction, of the radiating electrode 121 as in FIG. 6 though the dielectric 151D has the above-described shape, an advantageous effect equivalent to that of the antenna module 100 of exemplary Embodiment 1 can be exerted.

For an array antenna in which a plurality of radiating elements 125 are disposed adjacently, forming an area without a dielectric between the adjacent radiating elements by making the dielectric 151D slightly smaller enables isolation between the radiating elements to be improved.

Modifications 4 and 5

For Modifications 4 and 5, cases where the two dielectrics have different thicknesses (dimensions in the Z-axis direction) will be described.

Figure 7:
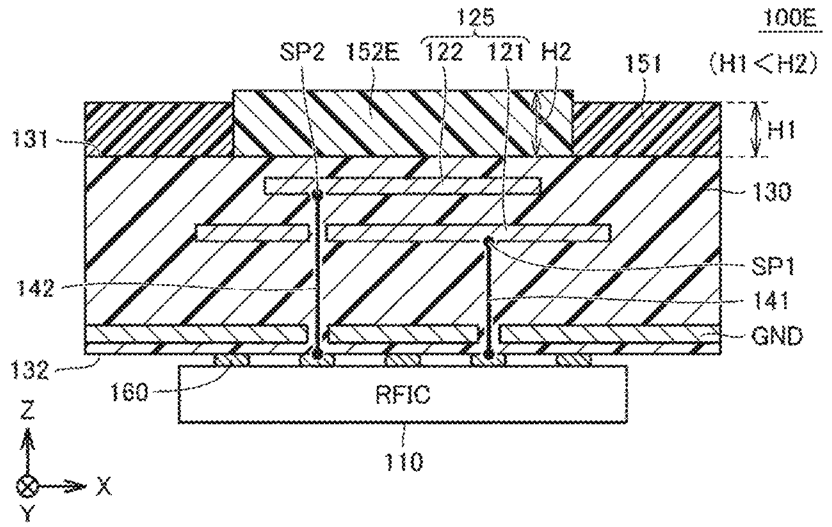
FIG. 7 is a side perspective view of an antenna module of Modification 4.

FIG. 7 is a side perspective view of an antenna module 100E of Modification 4. In the antenna module 100E, a thickness H2 of a dielectric 152E provided for the radiating electrode 122 for higher frequencies is larger than a thickness H1 of the dielectric 151 provided for the radiating electrode 121 for lower frequencies ($H1<H2$).

Figure 8:
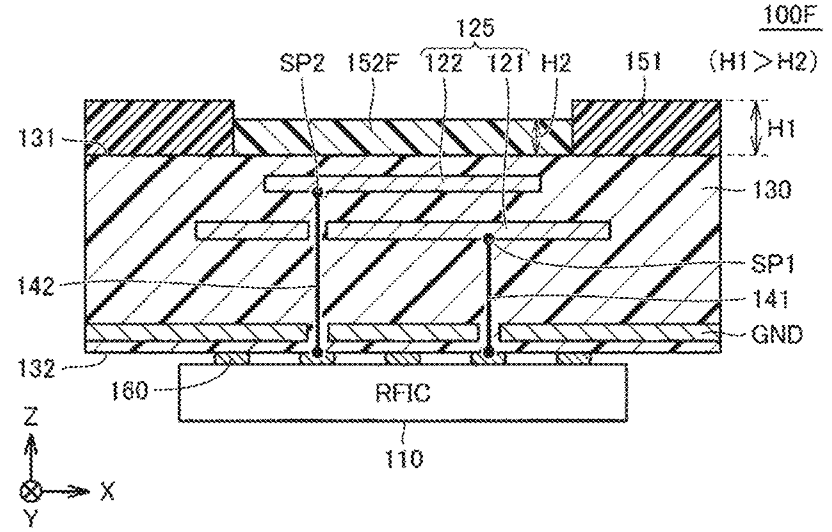
FIG. 8 is a side perspective view of an antenna module of Modification 5.

In contrast, in an antenna module 100F of Modification 5 in FIG. 8, the thickness H2 of a dielectric 152F provided for the radiating electrode 122 for higher frequencies is smaller than the thickness H1 of the dielectric 151 provided for the radiating electrode 121 for lower frequencies ($H1>H2$).

The effective dielectric constant of the dielectric disposed on the dielectric substrate 130 varies with the thickness of the dielectric. The thinker the dielectric, the higher the effective dielectric constant. Accordingly, by controlling the thickness of the dielectric appropriately for the used dielectric, a wider variety of usable dielectrics can be provided, and the dielectric constant appropriate for the radiating electrode can be controlled, thus leading to a higher degree of freedom in designing.

For example, by using dielectrics formed from the same material (that is, having the same dielectric constant) for the dielectric for the radiating electrode 121 and the dielectric for the radiating electrode 122 and by changing the thickness of each dielectric, the dielectric constant may be set at an effective dielectric constant suitable for the corresponding radiating electrode.

Nevertheless, setting the two dielectrics to have the same thickness as in exemplary Embodiment 1 leads to a flat surface of the antenna module and thus an advantage of easy handling in the manufacturing process.

Modifications 6 to 8

For the antenna module 100 of exemplary Embodiment 1, the configuration in which the two dielectrics 151 and 152 do not overlap with each other in the plan view in the direction of the normal line of the dielectric substrate 130 has heretofore been described. For Modifications 6 to 8, configurations in which the two dielectrics partially overlap with each other in the plan view in the direction of the normal line of the dielectric substrate 130 will be described.

Figure 9:
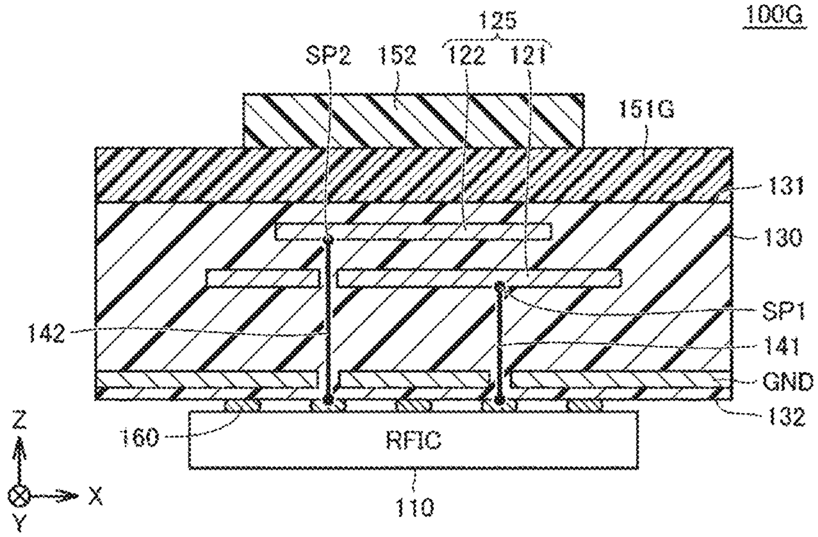
FIG. 9 is a side perspective view of an antenna module of Modification 6.

FIG. 9 is a side perspective view of an antenna module 100G of Modification 6. In the antenna module 100G, a dielectric 151G provided for the radiating electrode 121 is disposed over the all face of the dielectric substrate 130, and the dielectric 152 provided for the radiating electrode 122 is disposed in such a manner as to overlap with the upper surface of the dielectric 151G.

The radiating electrode 122 thus lies under the two dielectrics 151G and 152. Accordingly, a total dielectric constant of the dielectrics 151G and 152 for the radiating electrode 122 for higher frequencies is higher than the dielectric constant of the dielectric 151G for the radiating electrode 121 for lower frequencies. The configuration as described above is applicable to, for example, a case where a band widening requirement for the radiating electrode 121 is relatively low and in contrast a band widening requirement for the radiating electrode 122 is high.

Figure 10:
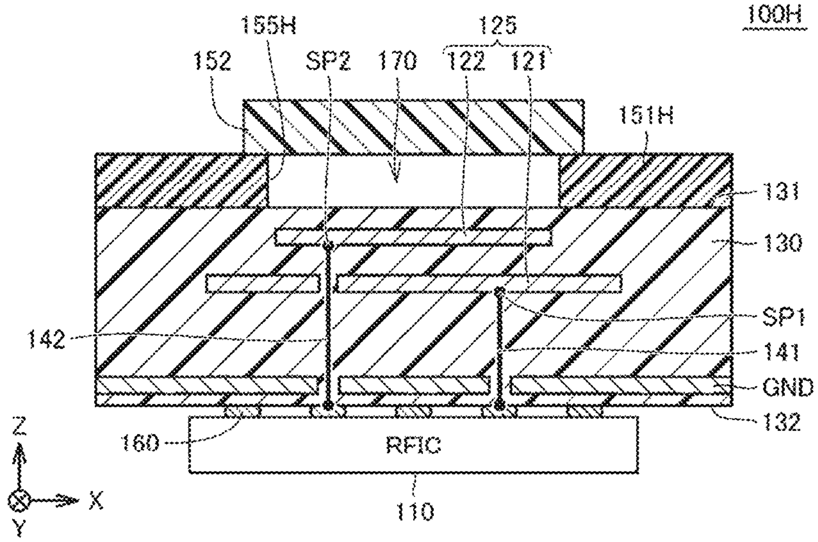
FIG. 10 is a side perspective view of an antenna module of Modification 7.

FIG. 10 is a side perspective view of an antenna module 100H of Modification 7. In the antenna module 100H, like the antenna module 100G of Modification 6, the dielectric 152 for higher frequencies is disposed in such a manner as to overlap with the upper surface of a dielectric 151H for lower frequencies; however, a cavity 155H is formed in a portion overlapping with the radiating electrode 122 in the dielectric 151H, and the dielectric 152 lies over the cavity 155H. This causes a hollow portion 170 to be formed between the dielectric 152 and the dielectric substrate 130. Forming the hollow portion 170 like this enables the effective dielectric constant for the radiating electrode 122 to be controlled.

The cavity 155H in Modification 7 corresponds to a second cavity in the present disclosure.

Figure 11:
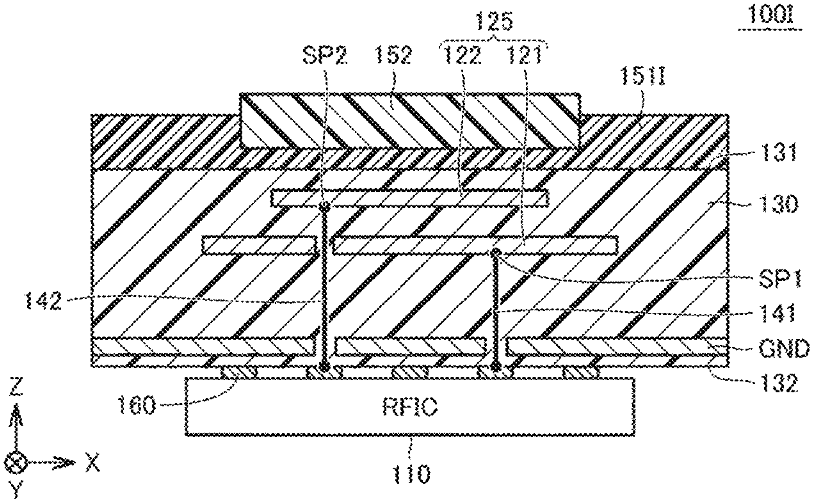
FIG. 11 is a side perspective view of an antenna module of Modification 8.

FIG. 11 is a side perspective view of an antenna module 100I of Modification 8. In the antenna module 100I, as in Modification 6, a dielectric 151I provided for the radiating electrode 121 is disposed over the all face of the dielectric substrate 130. However, the dielectric 151I in an overlapping portion where the dielectric 152 provided for the radiating electrode 122 is disposed is thinner than the other area, and part of the dielectric 152 is in a state of being embedded in the dielectric 151I. The embedding amount of the dielectric 152 is controlled by changing the thickness of the dielectric 151I in the overlapping portion, and thereby the effective dielectric constant for the radiating electrode 122 can be controlled.

Modifications 9 and 10

For the antenna module 100 of exemplary Embodiment 1, the configuration in which the dielectrics 151 and 152 are directly connected to the upper surface 131 of the dielectric substrate 130 has heretofore been described. In Modification 9 and Modification 10, configurations in which another member is disposed between the dielectric substrate 130 and the dielectrics 151 and 152 will be described.

Figure 12:
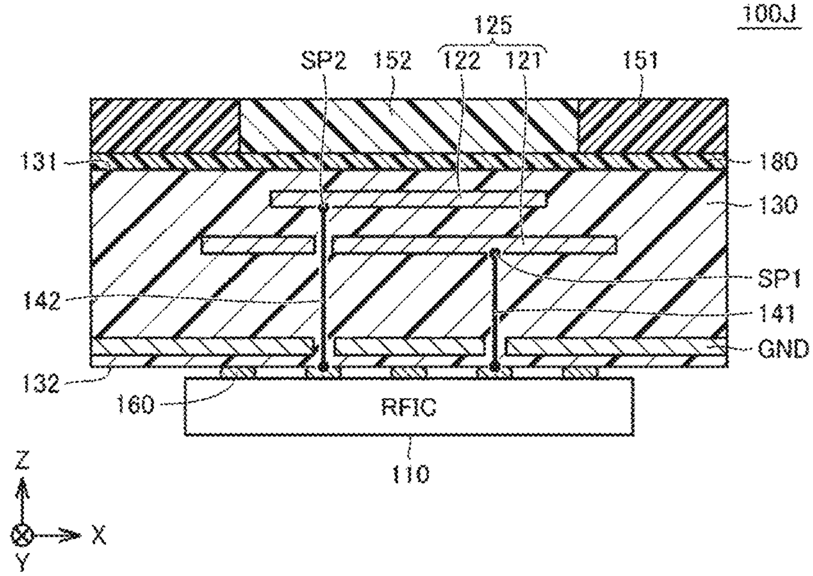
FIG. 12 is a side perspective view of an antenna module of Modification 9.

FIG. 12 is a side perspective view of an antenna module 100J of Modification 9. In the antenna module 100J, a connection member 180 is disposed between the dielectric substrate 130 and the dielectrics 151 and 152. The connection member 180 is, for example, an adhesive or an adhesive sheet and is a member for bonding the dielectrics 151 and 152 to the dielectric substrate 130.

Figure 13:
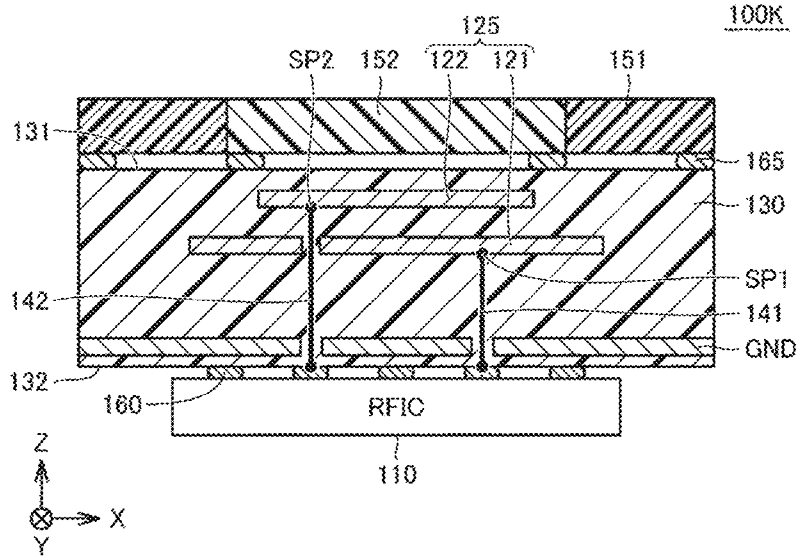
FIG. 13 is a side perspective view of an antenna module of Modification 10.

FIG. 13 is a side perspective view of an antenna module 100K of Modification 10. In the antenna module 100K, the dielectrics 151 and 152 are bonded to the dielectric substrate 130 by using solder bumps 165. In FIG. 13, a space is formed between the dielectric substrate 130 and the dielectrics 151 and 152 in a portion without the solder bumps 165; however, the space may be filled with an under fill.

The configuration such as the configurations of the antenna module 100J of Modification 9 and the antenna module 100K of Modification 10 is used, for example, in a case where of enhancing close contact between the dielectric substrate 130 and the dielectrics 151 and 152. Alternatively, the configuration is used in such a case of ex-post disposing of the dielectrics 151 and 152 after forming the dielectric substrate 130.

Modification 11

For exemplary Embodiment 1, the dual-band type configuration in which the two radiating electrodes 121 and 122 are stacked as the radiating element 125 has heretofore been described. For Modification 11, a triple-band type configuration in which three radiating electrodes are stacked will be described.

Figure 14:
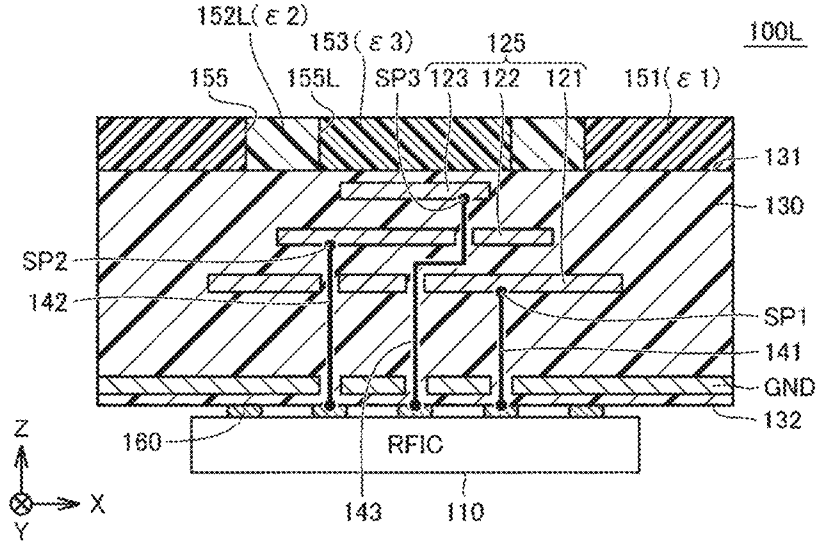
FIG. 14 is a side perspective view of an antenna module of Modification 11.

FIG. 14 is a side perspective view of an antenna module 100L of Modification 11. In the antenna module 100L, a radiating element 125L includes three radiating electrodes that are the radiating electrodes 121 and 122, and a radiating electrode 123. The radiating electrode 123 is disposed closer to the radiating electrode 122 than the upper surface 131 is in such a manner as to face the radiating electrode 122 in the dielectric substrate 130. The radiating electrode 122 is thus disposed between the radiating electrode 121 and the radiating electrode 123.

The radiating electrode 123 is smaller in size than the radiating electrode 122. The radiating electrode 123 is thus capable of emitting an electric wave in a frequency band higher than those for the radiating electrodes 121 and 122. The radiating electrode 123 is supplied with a radio-frequency signal from the RFIC 110 through a feed wiring line 143. The feed wiring line 143 penetrates through the ground electrode GND and the radiating electrodes 121 and 122 from the RFIC 110 and is connected to a feed point SP3 of the radiating electrode 123.

In the antenna module 100L, the dielectric 151 and dielectrics 152L and 153 are also disposed on the dielectric substrate 130. The dielectrics 151, 152L, and 153 are respectively provided for the radiating electrodes 121, 122, and 123.

Like the antenna module 100 of exemplary Embodiment 1, the cavity 155 larger in size than the radiating electrode 122 is formed in the dielectric 151, and a dielectric 152L is disposed in the cavity 155. In the dielectric 152L, a cavity 155L slightly larger in size than the radiating electrode 123 is formed, and a dielectric 153 is disposed in the cavity 155L.

In the plan view in the direction of the normal line of the dielectric substrate 130, the dielectric 153 lies over the radiating electrode 123 and is disposed within the area of the radiating electrode 122; however, this is not illustrated in the figure. The dielectric 152L is disposed within the area of the radiating electrode 121 and lies over the peripheral edge of the radiating electrode 122.

The dielectric constant ε1 of the dielectric 151, the dielectric constant ε2 of the dielectric 152L, and a dielectric constant ε3 of the dielectric 153 are mutually different, the dielectric constant ε2 is higher than the dielectric constant ε3, and the dielectric constant ε1 is higher than the dielectric constant ε2 (ε1>ε2>ε3).

Also in the triple-band type antenna module with the stack structure as described above, the antenna characteristic of each radiating electrode can be controlled individually by disposing the dielectric appropriate for the radiating electrode on the dielectric substrate. As the result, the antenna characteristic of the entire antenna module can be improved.

The radiating electrodes 121 to 123 in Modification 11 respectively correspond to the first radiating electrode, the second radiating electrode, and a third radiating electrode in the present disclosure. The dielectric 151, the dielectric 152L, and the dielectric 153 in Modification 11 respectively correspond to the first dielectric, the second dielectric, and a third dielectric in the present disclosure.

Embodiment 2

For exemplary Embodiment 2, a configuration in which the features of the present disclosure are applied to an array antenna having a plurality of radiating elements arranged therein will be described.

Figure 15:
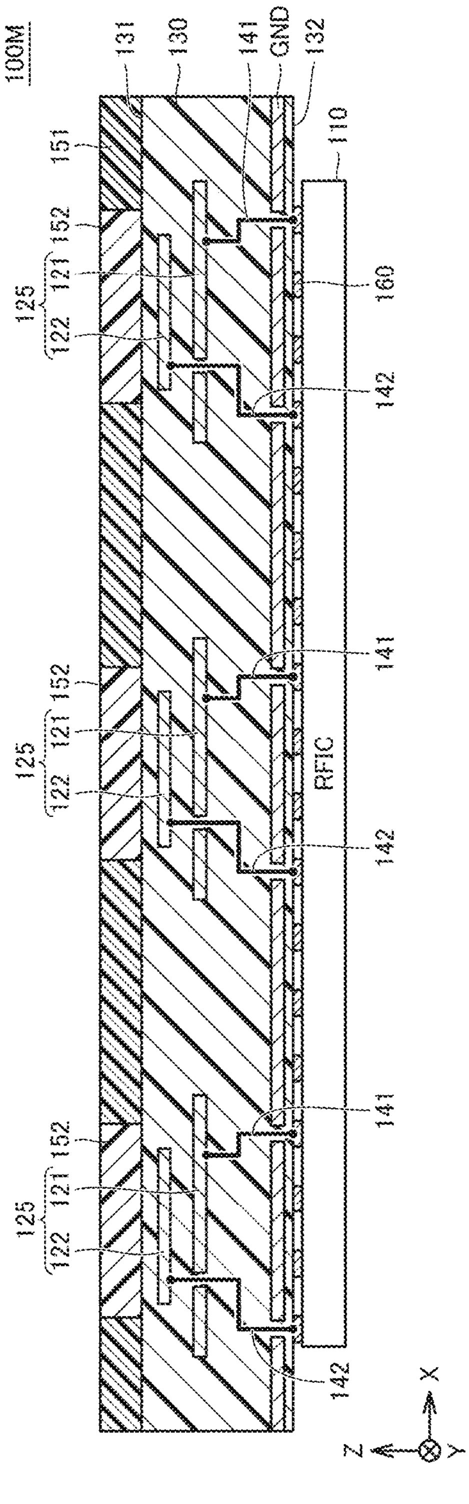
FIG. 15 is a side perspective view of an antenna module according to exemplary Embodiment 2.

FIG. 15 is a side perspective view of an antenna module 100M according to exemplary Embodiment 2. The antenna module 100M has a configuration in which the three radiating elements 125 are arranged in the X-axis direction in the dielectric substrate 130. The number of radiating elements included in the antenna module may be 2 or 4 or more. A configuration in which the radiating elements are arranged in a two-dimensional array may also be used.

Each of the plurality of radiating elements 125 includes the radiating electrodes 121 and 122 of different sizes. The size of the radiating electrode 122 is smaller than the size of the radiating electrode 121. In the plan view in the direction of the normal line of the dielectric substrate 130, the radiating electrode 122 is disposed in such a manner as to overlap with the radiating electrode 121. The radiating electrode 121 is disposed between the radiating electrode 122 and the ground electrode GND.

On the upper surface 131 of the dielectric substrate 130, each of the dielectrics 152 is disposed in a portion corresponding to the radiating electrode 122. On the upper surface 131 of the dielectric substrate 130, the dielectric 151 is disposed in a portion without the dielectric 152. Like exemplary Embodiment 1, in the plan view in the direction of the normal line of the dielectric substrate 130, the dielectric 152 lies over the radiating electrode 122 and is disposed within the area of the radiating electrode 121.

Also in the array antenna with the stack structure like the antenna module 100M, the antenna characteristic of each radiating electrode can be controlled individually by disposing the dielectric appropriate for the radiating electrode on the dielectric substrate. As the result, the antenna characteristic of the entire antenna module can be improved.

Embodiment 3

For exemplary Embodiment 3, a configuration in which two types of dielectrics are included in the casing of a communication apparatus will be described.

Figure 16:
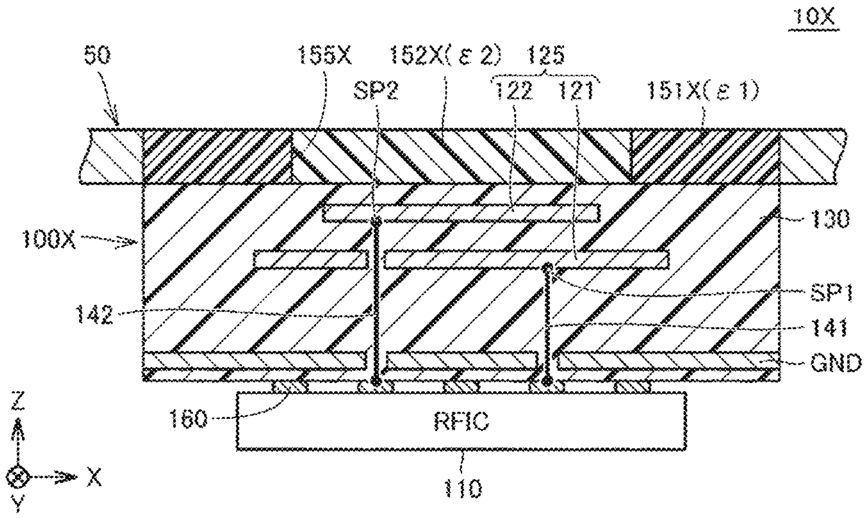
FIG. 16 is a side perspective view of a communication apparatus according to exemplary Embodiment 3.

FIG. 16 is a side perspective view of a communication apparatus 10X according to exemplary Embodiment 3. An antenna module 100X included in the communication apparatus 10X has a configuration in which the dielectrics 151 and 152 in the antenna module 100 illustrated in FIG. 2 are excluded and is disposed in contact with a casing 50 of the communication apparatus 10X. For the antenna module 100X, the description of the components overlapping with those of the antenna module 100 is not repeated.

On the casing 50 of the communication apparatus 10X, dielectrics 151X and 152X are disposed in a portion where the antenna module 100X is in contact with the dielectrics 151X and 152X. In a plan view in the direction of the normal line of the dielectric substrate 130 of the antenna module 100X, the dielectric 152X is disposed in such a manner as to lie over the radiating electrode 122 of the antenna module 100X. The dielectric 152X is larger in size than the radiating electrode 122 and smaller than the radiating electrode 121. The dielectric 152X is thus disposed within the area of the radiating electrode 121.

The dielectric 151X is disposed around the dielectric 152X. In the plan view in the direction of the normal line of the dielectric substrate 130, a cavity 155X is formed in the dielectric 151X, and the dielectric 152X is disposed in the cavity 155X. The cavity 155X is formed within the area of the radiating electrode 121. The dielectric 151X thus lies over the peripheral edge of the radiating electrode 121.

Also in the configuration in which the two types of dielectrics for the radiating electrodes are disposed in the casing, the antenna characteristic of each radiating electrode can be appropriately controlled by disposing the different dielectrics to lie over the peripheral edges, in the polarization direction, of the radiating electrodes and by setting a corresponding one of the dielectric constants of the respective dielectrics suitably for the radiating electrode. The frequency bandwidths for the radiating electrodes 121 and 122 can be widened appropriately.

The configurations in the exemplary embodiments and the modifications described above may be appropriately combined as long as the combination is not inconsistent.

The exemplary embodiments disclosed herein are illustrative and not in any way restrictive upon this disclosure or the appended claims. It is intended that the scope of the present disclosure is defined by the scope of claims, not by the description of the exemplary embodiments above, and include the meaning equivalent to the scope of claims and any change made within the scope.

REFERENCE SIGNS LIST

10, 10X communication apparatus
50 casing
100, 100A to 100M, 100X antenna module
110 RFIC
111A to 111H, 113A to 113H, 117A, 117B switch
112AR to 112HR low-noise amplifier
112AT to 112HT power amplifier
114A to 114H attenuator
115A to 115H phase shifter
116A, 116B signal multiplexer/demultiplexer
118A, 118B mixer
119A, 119B amplifier circuit
120 antenna device
121 to 123 radiating electrode
125, 125L radiating element
130 dielectric substrate
141 to 143 feed wiring line

151, 151A, 151B, 151D, 151G to 151I, 151X, 152, 152A to 152C, 152E, 152F, 152L, 152X, 153 dielectric
155, 155H, 155L, 155X cavity
160, 165 solder bump
170 hollow portion
180 connection member
200 BBIC
GND ground electrode
SP1 to SP3 feed point.

The invention claimed is:

1. An antenna module comprising:
a dielectric substrate;
a first radiating electrode disposed on the dielectric substrate;
in a plan view in a direction of a normal line of the dielectric substrate, a second radiating electrode that is disposed to overlap with the first radiating electrode and that is smaller in size than the first radiating electrode;
a ground electrode disposed to face the first radiating electrode and the second radiating electrode;
a first dielectric and a second dielectric that are disposed on a top part of the dielectric substrate, the first dielectric having a dielectric constant different from a dielectric constant of the second dielectric,
wherein in the dielectric substrate, the first radiating electrode is disposed between the second radiating electrode and the ground electrode, and
wherein in the plan view in the direction of the normal line of the dielectric substrate:
the second dielectric lies over the second radiating electrode and is disposed within an area of the first radiating electrode,
the first dielectric lies over at least a peripheral edge of the first radiating electrode
in the plan view in the direction of the normal line of the dielectric substrate, the first dielectric includes a first cavity, the first cavity being within the area of the first radiating electrode, and
the second dielectric is disposed in the first cavity.

2. The antenna module according to claim 1,
wherein the second dielectric is disposed on the first dielectric.

3. The antenna module according to claim 1,
wherein in the plan view in the direction of the normal line of the dielectric substrate,
a second cavity is in the first dielectric, the second cavity being within an area of the second radiating electrode, and
the second dielectric lies over the second cavity.

4. The antenna module according to claim 1,
wherein part of the second dielectric is embedded in the first dielectric.

5. The antenna module according to claim 1,
wherein the second dielectric lies over at least a peripheral edge, in a polarization direction of an emitted electric wave, of the second radiating electrode.

6. The antenna module according to claim 1,
wherein a thickness, in the direction of the normal line of the dielectric substrate, of the first dielectric is substantially identical to a thickness of the second dielectric.

7. The antenna module according to claim 1,
wherein a thickness, in the direction of the normal line of the dielectric substrate, of the first dielectric is larger than a thickness of the second dielectric.

8. The antenna module according to claim 1,
wherein a thickness, in the direction of the normal line of the dielectric substrate, of the first dielectric is smaller than a thickness of the second dielectric.

9. The antenna module according to claim 1,
wherein in the plan view in the direction of the normal line of the dielectric substrate, the first dielectric is smaller in size than the dielectric substrate.

10. The antenna module according to claim 1, further comprising:
in the plan view in the direction of the normal line of the dielectric substrate, a third radiating electrode that is disposed to overlap with the second radiating electrode and that is smaller in size than the second radiating electrode; and
a third dielectric disposed on the dielectric substrate,
wherein the second radiating electrode is disposed between the first radiating electrode and the third radiating electrode, and
wherein in the plan view in the direction of the normal line of the dielectric substrate, the third dielectric lies over the third radiating electrode and is disposed within the area of the second radiating electrode.

11. The antenna module according to claim 1, further comprising:
a connection member disposed between each of the first dielectric and the second dielectric and the dielectric substrate.

12. The antenna module according to claim 11,
wherein the connection member is an adhesive or an adhesive sheet.

13. The antenna module according to claim 11,
wherein the connection member is a solder bump.

14. An antenna module comprising:
a dielectric substrate;
a ground electrode disposed on the dielectric substrate;
a plurality of radiating elements disposed to face the ground electrode; and
a first dielectric and a second dielectric that are disposed on a top part of the dielectric substrate, the first dielectric having a dielectric constant that is different from a dielectric constant of the second dielectric,
wherein each of the plurality of radiating elements includes
a first radiating electrode, and
in a plan view in a direction of a normal line of the dielectric substrate, a second radiating electrode that is disposed to overlap with the first radiating electrode and that is smaller in size than the first radiating electrode,
wherein in the dielectric substrate, the first radiating electrode is disposed between the second radiating electrode and the ground electrode, and
wherein in the plan view in the direction of the normal line of the dielectric substrate:
the second dielectric lies over the second radiating electrode and is disposed within an area of the first radiating electrode,
the first dielectric lies over at least a peripheral edge of the first radiating electrode,
in the plan view in the direction of the normal line of the dielectric substrate, the first dielectric includes a first cavity, the first cavity being within the area of the first radiating electrode, and
the second dielectric is disposed in the first cavity.

15. The antenna module according to claim 1, further comprising:

a feeder circuit configured to supply each of the first radiating electrode and the second radiating electrode with a radio-frequency signal.

16. A communication apparatus comprising the antenna module according to claim 1.

17. A communication apparatus comprising:

a casing including a first dielectric and a second dielectric, the first dielectric having a dielectric constant that is different from a dielectric constant of the second dielectric; and an antenna module disposed in the casing, wherein the antenna module includes a dielectric substrate, a first radiating electrode disposed on the dielectric substrate, in a plan view in a direction of a normal line of the dielectric substrate, a second radiating electrode that is disposed to overlap with the first radiating electrode and that is smaller in size than the first radiating electrode, and a ground electrode disposed to face the first radiating electrode and the second radiating electrode, wherein in the dielectric substrate, the first radiating electrode is disposed between the second radiating electrode and the ground electrode, and wherein in the plan view in the direction of the normal line of the dielectric substrate:

the second dielectric lies over the second radiating electrode and is disposed within an area of the first radiating electrode, the first dielectric lies over at least a peripheral edge of the first radiating electrode, in the plan view in the direction of the normal line of the dielectric substrate, the first dielectric includes a first cavity, the first cavity being within the area of the first radiating electrode, and the second dielectric is disposed in the first cavity.

18. The antenna module according to claim 1, wherein the dielectric substrate is a multilayer dielectric substrate.

19. The antenna module according to claim 1, wherein the dielectric substrate is a single-layer dielectric substrate.

* * * * *